No. 653,228. Patented July 10, 1900.
F. FREESE.
NUT LOCK.
(Application filed Apr. 7, 1900.)
(No Model.)

WITNESSES.

INVENTOR.

UNITED STATES PATENT OFFICE.

FRANK FREESE, OF PHILADELPHIA, PENNSYLVANIA, ASSIGNOR TO HIMSELF AND EMIL J. BAHLS, OF SAME PLACE.

NUT-LOCK.

SPECIFICATION forming part of Letters Patent No. 653,228, dated July 10, 1900.

Application filed April 7, 1900. Serial No. 11,958. (No model.)

*To all whom it may concern:*

Be it known that I, FRANK FREESE, a citizen of the United States of America, residing in the city and county of Philadelphia, in the State of Pennsylvania, have invented a certain new and Improved Nut-Lock, of which the following is a true and exact description, reference being had to the accompanying drawings, which form a part thereof.

My invention relates to devices for locking bolt-nuts, and has for its object to provide a nut-locking device at once simple and efficient.

The nature of my invention will be best understood as described in connection with the drawings, in which it is illustrated, and in which—

Figure 1:
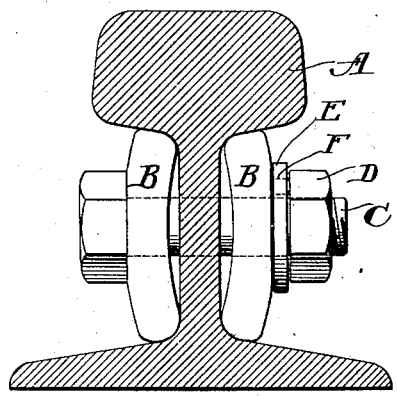
Figure 2:
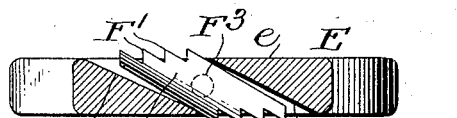
Figure 3:
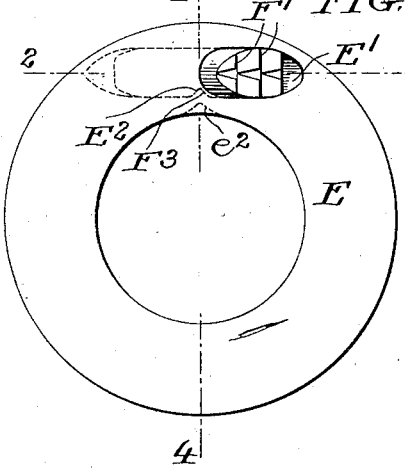

Figure 1 is a sectional view through a railway-rail, showing fish-plates secured to the rail by bolts and nuts and the nut locked in position by my improved locking device. Fig. 2 is a sectional view through my nut-locking washer, taken on the section-line 2 2 of Fig. 3. Fig. 3 is a plan view of the washer; and Fig. 4 is a cross-sectional view through the washer, taken on the section-line 4 4 of Fig. 3, the bolt, fish-plate, and nut being represented in dotted lines.

A indicates the rail; B B, the fish-plates; C, the bolt, and D the nut, all of ordinary construction.

Figure 4:
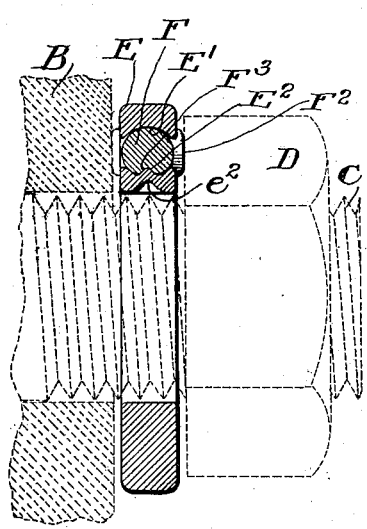

E indicates my improved nut-locking washer, $e$ $e$ indicating the opposite faces of the washer, and E' an oblique perforation extending from face to face of the washer, as shown in Figs. 3 and 4.

F is a stud which may conveniently be made of steel wire. This stud is of less diameter than the perforation E' and is centrally pivoted in said perforation, preferably upon a projection $E^2$ of the inner wall of the perforation, said projection being conveniently formed after the stud is in place in the perforation by forcing in by means of a punch a portion of the inner wall of the washer, as is indicated at $e^2$, this punching action forcing a portion of the inner wall of the perforation (indicated at $e^2$) into the metal of the stud, as indicated at $F^3$, Fig. 4. The ends of the stud F are sharpened or pointed, preferably in serrations, as indicated at F' and $F^2$, and the length of the stud is such that as it oscillates on its pivot $E^2$ it will in one position have its sharp points extending out beyond the faces $e$ $e$ of the washer and in the other extreme position have its sharp points lying substantially flush with the faces of the washer.

In operation the washer is placed between the fish-plate and nut on the bolt, as indicated in Fig. 1, and as the nut is screwed down it moves over the sharp edges of the stud, pushing them down in the slot, so that they offer substantially no resistance to the movement of the nut. Immediately, however, on a reversal of the direction of movement of the nut the threaded edges of the stud dig into the metal of the nut and of the fish-plate, effectually preventing the unscrewing of the nut, which indeed cannot ordinarily be accomplished without a complete disruption of the washer.

Having now described my invention, what I claim as new, and desire to secure by Letters Patent, is—

1. A nut-lock consisting of an annular washer having an oblique perforation extending from face to face in combination with a stud of less diameter than the perforation in the washer said stud being centrally pivoted in said perforation and having sharpened ends adapted to project beyond or lie substantially flush with the faces of the washer as the stud is oscillated on its pivot.

2. A nut-lock consisting of an annular washer having an oblique perforation extending from face to face and at its center lying close to the inner wall of the washer, in combination with a stud of less diameter than the perforation in the washer, said stud being centrally pivoted in said perforation on a projection from the inner wall of the perforation forced in from the inner wall of the washer and having sharpened ends adapted to project beyond or lie substantially flush with the faces of the washer as the stud is oscillated on its pivot.

FRANK FREESE.

Witnesses:
JOHN S. GRISCOM,
LENETTE MCFARLAND.